United States Patent [19]

Schiene et al.

[11] Patent Number: 5,023,178

[45] Date of Patent: Jun. 11, 1991

[54] COMPOSTING METHOD AND APPARATUS UTILIZING AIR ASSIST TO AID IN MOVEMENT OF ORGANIC MATTER

[75] Inventors: Thomas M. Schiene, Humble, Tex.; William Christie, Irondale, Ala.; Harold W. Johnson; Robert C. Black, both of Kingwood, Tex.

[73] Assignee: Ashbrook-Simon-Hartley Corporation, Houston, Tex.

[21] Appl. No.: 285,624

[22] Filed: Dec. 16, 1988

[51] Int. Cl.$^5$ .......................... C12P 1/04; C12M 1/04
[52] U.S. Cl. ..................................... 435/170; 435/313; 435/818; 422/184; 210/620; 71/9
[58] Field of Search ............ 435/287, 818, 313, 315, 435/316, 170; 422/184; 210/620; 71/9; 406/50, 76, 88, 89; 198/493, 721; 414/676

[56] References Cited

U.S. PATENT DOCUMENTS

| 2,527,466 | 10/1950 | Townsend et al. | 406/89 |
| 4,436,817 | 3/1984 | Nemetz | 422/184 |
| 4,798,802 | 1/1989 | Ryan | 435/287 |

FOREIGN PATENT DOCUMENTS

| 3504505 | 8/1986 | Fed. Rep. of Germany | 435/287 |
| 0045987 | 3/1984 | Japan | 435/287 |

Primary Examiner—David L. Lacey
Assistant Examiner—William H. Beisner
Attorney, Agent, or Firm—Foley & Lardner

[57] ABSTRACT

A composting method and apparatus is disclosed for accelerated decomposition of organic matter. The organic matter is deposited into a chamber of a vessel. A ram moves through a relatively short stroke within one end of the vessel so that organic matter deposited in the vessel at one end may be moved through the chamber and discharged at the other end as a result of each successive charge of material pushing the preceding charge forward through the vessel by the action of the ram. The vessel includes a set of orifices in a floor of the chamber for introducing pressurized air into the vessel. During the normal composting operation, pressurized air passes through these orifices at a relatively low intensity to aerate the organic matter. At certain times during operation of the ram, a surge of pressurized air will be introduced into the chamber of the vessel through the orifices at such an intensity as to effect movement of the organic matter through the chamber with a ram force which is substantially less than the ram force required to move the organic matter absent the surge of air. This provides a substantially less dense mass of organic matter moving through the chamber of the vessel than would be produced without the delivery of the surge of pressurized air.

3 Claims, 2 Drawing Sheets

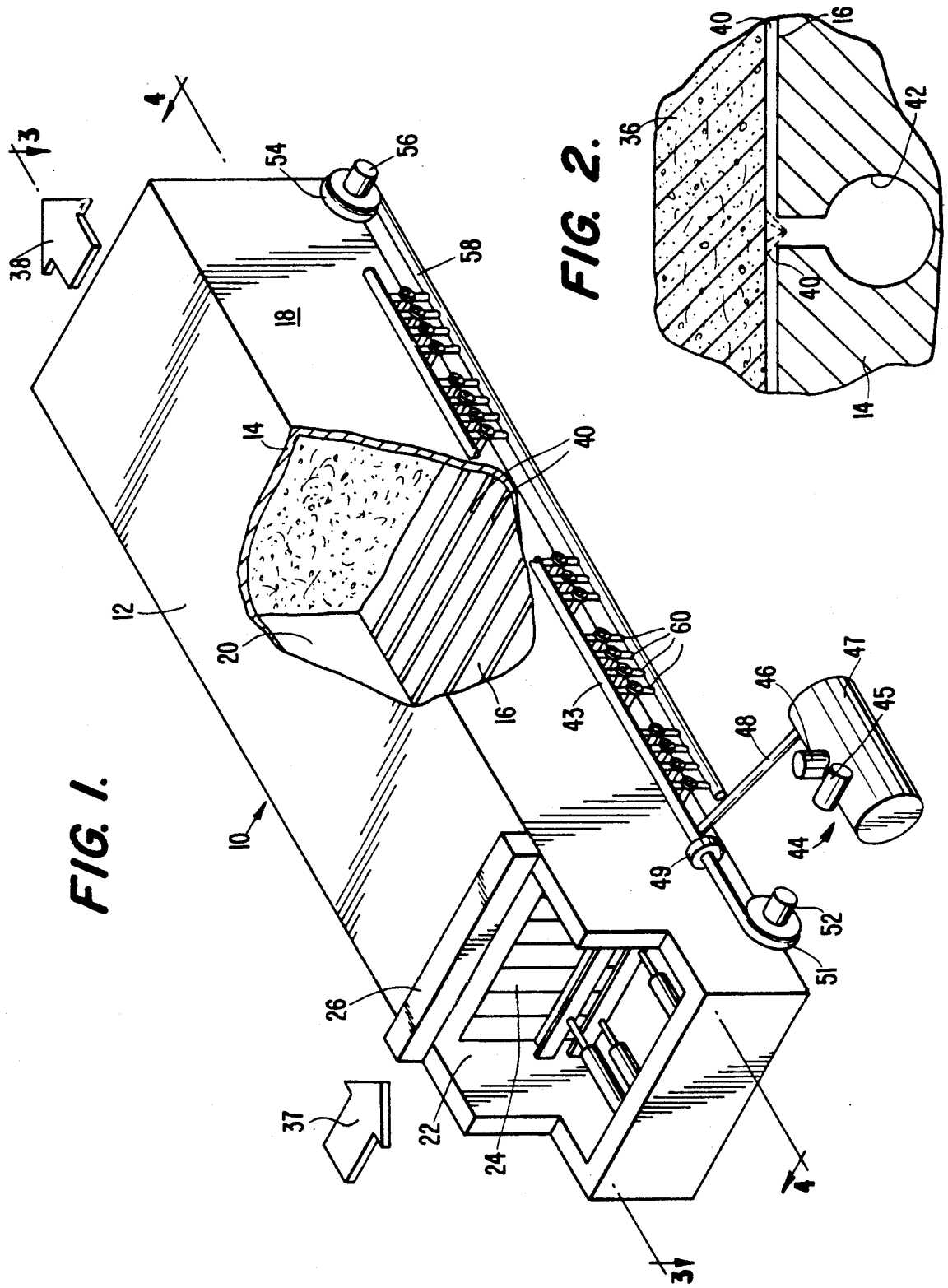

COMPOSTING METHOD AND APPARATUS UTILIZING AIR ASSIST TO AID IN MOVEMENT OF ORGANIC MATTER

BACKGROUND OF THE INVENTION

1. Field of the Invention

The invention relates to a method and apparatus for aerobic composting of organic waste matter in a composting vessel utilizing pressurized air for aeration of the organic matter during the composting process.

2. Discussion of the Prior Art

It is known to compost organic waste material, such as sludge from a waste water treatment facility or garbage, utilizing mechanical composting bins or vessels and pressurized aeration channels. The goal is to produce a nonodorous organic material which can often be sold as a soil additive and which at least is not costly or objectionable to dispose of. In the process, the amount of water in the composting material is reduced, thus resulting in drying of the organic matter to further alleviate any disposal problem.

The usual proposals for mechanical composting have involved upright, cylindrical devices in the nature of silos through which pressurized aeration air is circulated to aid in the decomposition process. Such vertical devices may result in excessive compaction of material which has been vertically stacked. The equipment also tends to be mechanically complicated, with high power consumption.

As an alternative to vertical composting silos, it is known to provide a horizontal composting method and apparatus of a simple construction in which organic matter is moved horizontally along the length of the composting vessel in a stepwise fashion with the use of a hydraulically actuated ram. Diffusers along the length of the vessel inject aeration air into the organic matter to aid in carrying out the composting process in a relatively short period of time. Such a method and apparatus is disclosed in U.S. Pat. Nos. 4,384,877 and 4,436,817 to Nemetz, which U.S. patents are hereby incorporated herein by reference.

Although horizontal, or at least non-vertical, mechanical composters have represented a substantial advance in the art, particularly in that they avoid unduly compacted regions of organic matter in the vessel, while at the same time providing a very simple and economical-to-operate structure, it has been found that even further reduction in the extent of compaction of the organic matter without adding substantially to the complexity or operating cost of the device would be desirable. Such an improvement would avoid the need for cooling of the aeration air injected into the organic matter during composting at times when the surrounding ambient air temperatures are relatively high. In this regard, compaction of the mass of organic matter, which in turn leads to a high pressure drop in the aeration air being injected into the mass of organic matter, requires cooling of aeration air to provide cooling of the mass of organic matter. By achieving a lesser extent of compaction, the amount of energy required for injection of aeration air into the organic matter, which occurs over a relatively long period of time, could also be significantly reduced. Both the temperature and the pressure of the aeration air are interrelated, in that increased pressure results in an increased temperature of the aeration air. During hot weather, the temperature increase over ambient temperature due to pressurization of the aeration air may cause the temperature of the aeration air to exceed the maximum safe level for aerobic decomposition. To counteract this with air cooling equipment is expensive, both in terms of capital investment and operating costs.

By decreasing the extent of compaction, i.e., by decreasing the density of the mass of organic matter being moved through the vessel by the hydraulic ram, the required pressure for effecting penetration of aeration air could be reduced. This, in turn, would save energy in driving the blowers producing the aeration. It would also eliminate the need for expensive cooling equipment at times of relatively high ambient temperatures.

Further, by reducing the amount of compaction of the mass of organic matter resulting from pushing the mass through mass vessel, it becomes practical to build larger composting vessels than would otherwise be practical without the present invention. Normally, as the composting vessel is made larger, the ram pressure needed to push the larger mass through the vessel increases and so does the degree of compaction of the mass. With the present invention, however, the degree of compaction is reduced, permitting construction of a longer vessel which does not cause excessive compaction of the mass. The longer vessel handles higher volumes of organic matter with less capital investment per given unit of compost produced. That is, using the present invention, more compost may be produced by using a longer vessel without increasing the cost of, for example, the infeed conveyor, the ram, and the ram drive mechanisms.

OBJECTS OF THE INVENTION

It is therefore an object of the present invention to provide a composting method and apparatus in which the density and compaction of the mass of organic matter moved through a composting vessel by a ram is reduced.

It is related object of the present invention to provide a composting method and apparatus in which such reduction in density and compaction of the organic matter is achieved in a mechanically simple and inexpensive manner.

It is yet another object of the present invention to provide a composting apparatus in which operating costs and energy consumption are reduced as compared with known systems.

It is a further object of the present invention to provide a composting method and apparatus in which the temperature of aeration air circulating through the organic matter being composed may be reduced without the use of cooling equipment.

It is another object of the present invention to provide a composting method and apparatus in which the amount of pressure required to effect penetration and circulation of aeration air through the mass of organic matter being composted is reduced as compared with known devices and in which this is accomplished in a very simple and economical manner.

It is also an object of the present invention to provide a composting method and apparatus which uses a larger composting vessel that has hereto been feasible without increasing the degree of compaction of the compost produced in the larger vessel.

These and other objects and advantages of the present invention will be more fully brought out in the description which follows with reference to the accompanying drawings.

SUMMARY OF THE INVENTION

To achieve the foregoing objects, the present invention provides a composting apparatus and method for accelerated aerobic decomposition of organic matter in which organic matter is deposited into a chamber of a vessel. The vessel includes an inlet to the interior chamber of the vessel and an outlet from the chamber. A ram is coupled with the vessel and is movable within an inlet end region of the chamber. This exerts a compressive force on the organic matter. Thus, organic matter deposited in the vessel through the inlet may be moved through the chamber toward the outlet by the action of the ram.

A set of orifices in the vessel introduce pressurized air into the vessel. Normally, such pressurized air will be introduced at a relatively low intensity for aeration purposes. When necessary, however, during at least part of the time when the ram is exerting force on the organic matter to move it through the vessel, a surge of pressurized air is delivered into the chamber, the surge of pressurized air being of such intensity as to effect movement of the organic matter through the chamber at an application of compressive force by the ram which is substantially less than the compressive force required to move the organic matter absent the surge of air. This produces a substantially less dense mass of organic matter than would be produced if no such surge of pressurized air were delivered.

BRIEF DESCRIPTION OF THE DRAWINGS

FIG. 1 is a perspective view, partially cut away, of a composting apparatus according to the present invention;

FIG. 2 is an enlarged, fragmentary, detailed sectional view taken in the same plane as the sectional view of FIG. 3, but showing in closeup the relationship between the charge of organic matter and the floor of the composting apparatus;

DETAILED DESCRIPTION OF THE PREFERRED EMBODIMENTS

Figure 3:
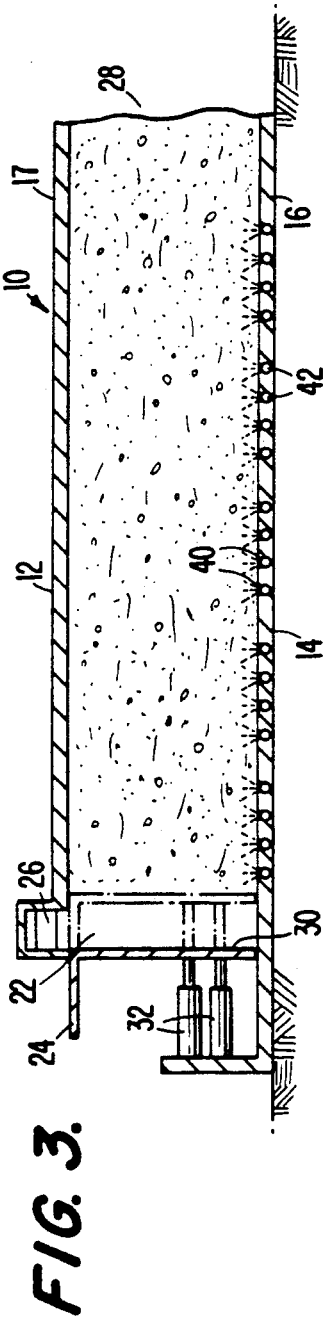
FIG. 3 is a view in vertical section of the composting apparatus of FIG. 1 taken on the line 3—3 of FIG. 1.

Reference numeral 10 refers generally to a composting apparatus according to the particular exemplary embodiment of the present invention as shown and described herein. Composting apparatus 10 includes a hollow vessel 12 defined by walls 14. In the particular embodiment as shown and described, the vessel has a rectangular cross section such that walls 14 include a floor 16, a top wall 17, and side walls 18 extending in parallel fashion between the floor 16 and top wall 17. Walls 14 define a chamber 20 within vessel 12. As will be seen from the drawings, vessel 12 and its internal chamber 20 are elongated so as to take the form of a conduit.

At one end of vessel 12 is an inlet 22 having an inlet door 24 and an infeed conveyor 26, whereby inlet 22 in conjunction with infeed conveyor 26 permits communication with chamber 20 within the vessel 12. At the opposite end of vessel 12 is an outlet 28.

Within chamber 20 adjacent inlet 22 is a ram 30 driven by a set of hydraulic cylinders 32. Hydraulic cylinders 32, in turn, are actuated by a source of pressurized hydraulic fluid 34 shown schematically in FIG. 4, which pressure source 34 communicates with hydraulic cylinders 32 via hydraulic fluid lines 35. Preferably, the source of pressurized hydraulic fluid 34 will take the form of a motor-driven hydraulic pump feeding hydraulic fluid in the form of oil to hydraulic cylinders 32 via hydraulic line 35 to move the ram 30.

Organic matter, such as sludge from a waste water treatment system, is fed into the composting apparatus 10 via infeed conveyor 26 in a direction shown by arrow 37 (FIG. 1.) The organic matter is fed into chamber 20 at the end thereof adjacent inlet 22 and is deposited in front of ram 30. Hydraulic cylinders 32 are actuated to move ram 30 in a direction toward outlet 28 in order to advance the charge of organic matter 36 through composting apparatus 10. The advance of ram 30 is shown in phantom lines in FIG. 3.

The distance between the retracted position of ram 30 as shown in solid lines in FIG. 3 and the fully advanced position as shown in phantom lines in FIG. 3 represents the volume of one charge of organic matter 36 fed into the composting apparatus 10 during one infeed operation. After such an infeed operation, ram 30 is retracted to the solid line position shown in FIG. 3 in preparation for the next infeed operation.

During advance of the organic matter 36 after an infeed operation, inlet door 24 moves horizontally behind the ram 30 as the ram 30 moves forward in its stroke to push organic matter 36 through chamber 20 of vessel 12. As new charges of material are advanced through the vessel 12 via the infeed operation in advance of the ram 30, earlier charges of organic matter 36 which have advanced entirely through vessel 12 and with respect to which the composting operation has been completed are discharged from vessel 12 via outlet 28. The direction of discharge is illustrated by arrow 38 in FIG. 1.

Vessel 12 includes in the floor 16 a set of floor-mounted diffusers or orifices 40 distributed along virtually the entire length of vessel 12. These diffusers 40 communicate with chamber 20 of vessel 12 to permit pressurized air to be injected into chamber 20. The air injection is accomplished via air passages 42 in floor 16, which air passages are fed by an air header 43 disposed outlet vessel 12. Thus, air header 43 communicates with the series of air passages 42 which, in turn, communicates with diffusers 40 for injecting air into chamber 20.

In the particular exemplary embodiment shown and described herein, two separate sources of pressurized air communicating with the header 43, passages 42, and diffusers 40 will be described. One source provides air for effecting aeration of the organic matter 36 to convert it to compost in a known manner. The other source provides for a surge of pressurized air through the same header 43, passages 42, and diffusers 40 to assist in the movement of organic matter 36 through the vessel 12. It is to be appreciated that, although two separate sources (one for aeration air, the other for surge air) are preferred, it is also possible to combine these sources into a single source in which the aeration air is furnished by that source at a relatively low intensity and the surge air is provided by that same source at a relatively high intensity.

According to the particular exemplary embodiment of the present invention shown and described herein, the surge air is provided by a source in the form of a compressor system 44 which includes a motor 45, preferably an electric motor, driving an air compressor 46 which, in turn, feeds an accumulator 47 which stores a substantial quantity of pressurized air. A line 48 extends from the accumulator 47 to the air header 43 to provide a surge of air to header 43 and thus to air passages 42 and diffusers 40. A check valve 49 isolates the source of surge air from the source of aeration air when surge air is introduced into air header 43.

Turning to the source of aeration air, such air is generated by a blower 51 driven by electric motor 52. Aeration air is fed past check valve 49 into air header 43 to then pass through air passages 42 in floor 16 of chamber 20 and thence through diffusers 40 for aeration of the organic matter 36 to aid in composting.

A selected portion of the set of diffusers or orifices 40 may act as suction orifices or inlets for return of aeration air which has been introduced into the organic matter 36 by others of the diffusers or orifices 40. By providing that some of the orifices 40 act as air returns, circulation through the organic matter 36 may be improved.

This aeration air return is accomplished via a suction fan 54 driven by a motor 56. Suction fan 54 communicates with the suction header 58 which, in turn, selectively communicates with a certain portion of the air passages 42. When certain air passages 42 are in communication with suction header 58, air passages 42 then act as air returns for drawing aeration air from organic matter 36 to enhance circulation of aeration air.

Selection of which of orifices 40 will act as diffusers for introducing aeration air into chamber 20 and which of orifices 40, and associated air passages 42, will act as air returns is determined by a series of valves 60, preferably in the form of solenoid valves. Preferably, too, such a valve 60 will be disposed between each air passage 42 and the air header 43 and suction header 58. In this way, the condition of each valve 60 determines whether the associated air passage 42 communicates with the air header 43 (in which case that air passage will receive pressurized air so that the associated orifices 40 act as diffusers for introducing air into chamber 20) or will communicate with suction header 58 (in which case that air passage 42 and its associated orifices 40 act as air returns for withdrawing aeration air from chamber 20.) The particular pattern of which air passages 42 and associates orifices 40 are placed under suction and which are placed under pressure may vary from case to case depending on the particular organic matter 36 being composted and the particular conditions under which the composting takes place. For instance, under some circumstances, the best results may be obtained by placing all of the air passages 42 and orifices 40 under pressure. In other instances, perhaps half of the air passages 42 and orifices 40 will be placed under suction via actuation of valves 60 to effect communication with suction header 58. An alternating pattern may be used such that an air passage 42 under pressure is followed by an air passage 42 under suction, followed by another air passage 42 under pressure, and so on. As an alternative, separate zones of pressure and suction diffusers may be provided. In the particular exemplary embodiment shown and described, there are five zones of four air passages per zone. Each zone corresponds generally with a charge of material fed into vessel 12 by one infeed operation and one stroke of ram 30. Thus, one such zone may be put under pressure, the next under suction, and so on in an alternating fashion.

The surge-delivering system of the present invention accomplishes the delivery into the vessel 12, at least at certain times when ram 30 is acting upon organic matter 36, of a surge of pressurized air of such intensity as to effect movement of the organic matter 36 through chamber 20 with substantially less force from the ram 30, and thus substantially less compaction of organic matter 36 than if no such surge were provided.

The surge-delivering system includes a surge-producing control 62 connected with a valve 63 in a line 48 which extends from the accumulator 47 of compressor 44 to the air header 43. When surge-producing control 62, which preferably takes the form of an electronic controller, sends a signal to valve 63, which preferably takes the form of a solenoid valve, to open, a surge of air from compressor system 44 and accumulator 47 is introduced into air header 43 to, in turn, send a surge of air through air passages 42 and floor-mounted orifices 40.

Complementing the surge-producing control 62 is an aeration-producing control 64 coupled with the blower 51 which produces aeration air, and more specifically with the motor 52 of that blower. Aeration-producing control 64 is preferably electronic and sends electrical signals to motor 52 of blower 51 to regulate the intensity of aeration air produced by blower 51. Preferably, too, both surge-producing control 62 and aeration-producing control 64 will be housed together in a single unit constituting an air controller 65 schematically shown by broken lines in FIG. 4. Thus, air controller 65 controls both the delivery of aeration air and the delivery of surge air.

Although not the preferred embodiment, it has been previously mentioned that both aeration air and surge air may come from the same source, i.e., a single compressor or blower. That single source will be controlled by the air controller 65, which includes both the surge-producing control 62 and the aeration-producing control 64. With a single supply which is so controlled, the aeration-producing control 62 can be as simple as a relatively low range of rheostat settings on controller 65 to produce a relatively low intensity of pressurized air for effecting aeration and, in the same vein, the surge-producing control can be as simple as a relatively high range of rheostat settings in the controller 65 to produce a higher intensity output from the blower or compressor for producing the requisite surge of pressurized air.

Just as the sources of aeration and surge air have controls, so too the source of suction air, i.e., the suction fan 54 driven by motor 56, has a suction-producing motor control 66 for energizing motor 56 of suction fan 54 and for regulating its operation. Preferably, too, suction-producing motor control 66 is electronic.

Figure 4:
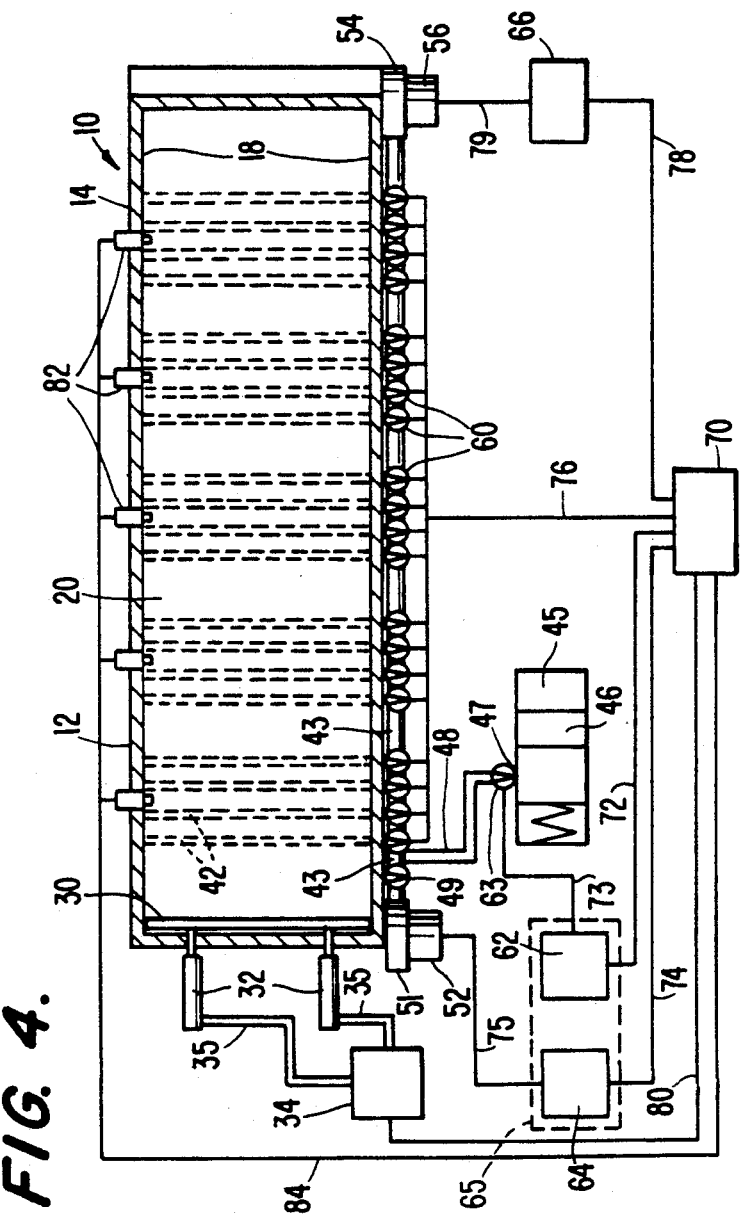
FIG. 4 is a view in horizontal section of the composting apparatus taken on the line 4—4 of FIG. 1 and showing the control system for the composting apparatus in schematic form.

It is preferred that each of the controls 62, 64, 66 be coupled with a master controller 70 shown schematically in FIG. 4. Master controller 70 acts as a central station from which the delivery of aeration air, surge air, and suction air may be controlled. While electronic, master controller 70 may consist of manually operable switches and dials to be operated by a human controller, or it may be an automated controller operating according to a predetermined program utilizing analog or digital electronics, or it may be a hybrid system utilizing both manual switches and dials as well as a predetermined control program.

Master controller 70 is coupled with surge-producing control 62 via line 72. In turn, surge-producing control 62 is coupled with valve 63 of the compressor system 44 via line 73. Master controller 70 is connected to the aeration system via line 74 running to aeration-producing control 64. In turn, aeration-producing control 64 is coupled to motor 52 of blower 51 via line 75. The master controller is preferably also coupled with valve 60 which determines the pattern of which air passages 42 and orifices 40 are under pressure and which, if any, are under suction. In this regard, controller 70 provides the appropriate signals to valves 60 over a line 76 (FIG. 4.) Master controller 70 controls the source of suction by sending signals to suction-producing control 66 over line 78. In turn, suction-producing control 66 is coupled with motor 56 of suction fan 54 by line 79.

Master control 70 also controls the operation of the ram 30 which is driven by hydraulic cylinders 32. Further, master controller 70 requires feedback from the hydraulic system for driving the ram 30 in order to effect control of the surge air from compressor system 44 to provide the air assist to aid in the movement of the organic matter 36 with the ram 30. This control and this feedback is provided over line 80 which extends between master control 70 and the hydraulic pressure source 34.

The temperature of aeration air has a bearing on the need for surge air to aid in the movement of the organic matter 36 and to regulate and reduce the extent of compaction of the organic matter 36. Thus, a series of temperature probes 82 extend into chamber 20 to measure the temperature of the organic matter 36 in the various zones of the composting apparatus 10. Signals from the various temperature probes 82 are preferably fed back over line 84 to master controller 70 to be observed and considered by the human operator or to be input as a variable into a control program, or both.

The composting apparatus 10 of the present invention is illustrated as having a horizontal vessel 12. While the vessel need not be precisely horizontal, i.e., while it may be inclined, the composting apparatus of the present invention is of a type different from the presently more well known vertical composting devices. With a horizontal or at least non-vertical composting apparatus, the density of organic matter 36 from the infeed to the discharge end of the device is substantially uniform throughout. By contrast, with a vertical composting apparatus, the bottom of the vertical column of material will be highly compacted as compared with the top of the column. The uniformity of compost density is a major advantage of horizontal or non-vertical composting. As will be described in more detail, the present invention takes this advantage a step further by lessening and controlling the density of the compost beyond what would be possible in previously known horizontal or non-vertical composting devices.

The purpose of composting, particularly as it relates to composting of sludge produced by waste water treatment facilities, is that the composting process provides a nonodorous organic matter which can be sold as a soil amendment and which, at the very least, is nonobjectionable as a material to be disposed of. This, of course, contrasts with ordinary sludge, an objectionable material which is costly and difficult to dispose of. The composting process to which the present invention is directed involves aerobic decomposition of organic matter over a period of time, a process which kills pathogens. In the meantime, the volume of water in the sludge being treated is reduced in the material discharged from the composting apparatus. This represents a further advantage of composting the sludge. The dewatered sludge is typically mi>:ed with sawdust to decrease the sludge density and make the sludge porous so air may flow through it during the composting operation. It will be understood that the more the organic matter is compacted during composting as a result of being pushed by the ram 30, the more dense the organic matter becomes and the more difficult it becomes to aerate the organic matter with pressurized air, which aeration is an important part of the composting process.

As ram 30 pushes a fresh charge of organic matter 36 through vessel 12, the newly deposited charge of organic matter (i.e., that charge which has not yet been advanced along the vessel 12 becomes more and more compressed. The force of ram 30 is translated to more pressure against walls 14 of the vessel 12, further adding to compaction of the new charge of organic matter 36. Typically, a charge of organic matter fed into vessel 12 during the infeed operation will measure 18 inches in the axial direction, i.e., the direction from the inlet toward the outlet of the vessel 12, and this particular charge of material will be compressed to 9 inches in the axial direction before the entire mass of organic matter 36 in the vessel 12, including the new charge, begins to move through the vessel.

This compaction of the organic matter 36 inhibits the penetration and circulation of aeration air being fed into the organic matter 36 through orifices 40. The resistance to aeration caused by the compaction of the organic matter 36 requires increased pressure of aeration air to provide the necessary aeration air penetration and circulation. In turn, the increased pressure of aeration air increases the heat of the aeration air stream passing through the mass cf organic matter 36. For every one psi increase in the pressure of the aeration air, the temperature of the air rises by 10° F. Since the maximum temperature at which a high rate of aerobic decomposition may occur is 149° F., and that temperature can easily be exceeded due to the need for increased pressure to effect penetration and circulation of aeration air through the mass of organic matter 36, it becomes advantageous to provide an arrangement which produces a cooler mass of organic matter.

This is accomplished by reducing the amount of pressure required to effect penetration and circulation of aeration air so that the temperature of the aeration air will be low enough that special cooling apparatus—and attendant high energy consumption and capital investment—is not required. In this regard, it has been found desirable to keep the pressure of aeration air in the air header 43 at or below 3 psi. With an ambient temperature of 90° F., a 3 psi pressure for the aeration air will result in a 30° temperature rise in the aeration air to a level of 120° F., which constitutes a safe level for aerobic decomposition. This can be accomplished with the present invention, while still ensuring adequate penetration of aeration air and while avoiding the need for expensive cooling equipment. Another advantage of being able to accomplish aeration with less pressure in the aeration air system is that the cost of running the blowers, including both the aeration air blower 51 and the suction fan 54, goes down, since these blowers may be operated at a lesser intensity.

According to the present invention, the charge of organic matter 36 is pushed through the vessel 12 with substantially less compaction than has heretofore been the case, which in turn results in easier circulation of aeration air at a lower pressure through the mass of organic matter 36, with all the attendant advantages already described. It will be understood in this regard that the surge of pressurized air provided by the surge-producing control 62 via the compressor system 44 does not necessarily operate throughout the entire stroke of ram 30 and does not necessarily operate during every stroke of ram 30. The need for the surge of pressurized air which will pass through the same orifices 40 as the aeration air is determined by the amount of hydraulic pressure from the pressure source 34 to actuate the hydraulic cylinders 32 to move the ram 30. When that pressure reaches a certain level during the forward stroke of the ram 30 without the mass of material 36 being moved, the surge of pressurized air will be introduced through the air header 43 into air passages 42 and through the orifices 40 to reduce the friction between the mass of organic matter 36 and at least the floor 16, and perhaps also with respect to the remaining walls of the vessel 12, to cause the charge of material to be moved at a lesser ram force than would otherwise be needed.

It is believed that the surge of pressurized air creates a thin layer of air 90 (FIG. 2) between the mass of organic matter 36 and the floor 16 of the vessel 12. It may also create a similar thin layer of air between all or some of the remaining walls of the vessel 12 and the mass of organic matter 36. The effect is similar to that of a Hovercraft or ground effect vehicle which rides on a thin layer of pressurized air produced by the craft or vehicle. This surge of pressurized air provided by the present invention tends to "unweight" the mass of organic matter 36 by lessening the force exerted by the mass of organic matter on the floor 16 of vessel 12. That is, the surge of pressurized air during the forward stroke of ram 30 provides an upward force on the overall mass of organic matter 36 which counteracts the downward force of gravity, thus greatly reducing the friction between the mass of organic matter 36 and the floor 16, and it also is believed to create a thin layer of air between the mass and the vessel. That layer of air becomes the interface on which the mass or organic matter moves. The coefficient of friction of the air layer/mass interface is much less than that of the interface of organic matter/concrete (or other solid wall or floor material) which would otherwise exist. This, in turn, allows the mass of organic matter 36 to slide forward in an advancing direction in the vessel with much less ram force than would otherwise be needed and thus much less compaction of organic matter 36.

By providing the surge of pressurized air during the forward stroke of the ram, the aforementioned charge of material having an 18 inch axial dimension is compressed to only 12 inches by the ram at the point where the entire mass of organic matter 36 moves. This contrasts with the 9 inches to which the fresh charge would be compacted before such movement, as would be the case without the surge of pressurized air.

An experimental prototype unit using the method and apparatus of the present invention will now be described. The prototype unit included a vessel 12 which was 24 feet long, versus the normal full-length vessel of 63 feet. Without any air assist, i.e., without anything other than aeration air, the hydraulic system for operating the ram required a pressure of 4,000 psi to move the mass of organic matter 36, which hydraulic system pressure translates into 20 psi on the face of the ram itself. Utilizing the present invention and providing a blast of pressurized air through orifices 40 during the forward stroke of the ram, the amount of pressure in the hydraulic system necessary to move the mass of organic matter 36 was reduced to 2,000 psi, which translates to 10 psi on the face of the ram 30.

The weight of the mass of organic matter 36 on the floor 16 has been observed at 4.5 psi. When a short blast of air according to the present invention is provided during the forward stroke of the ram, this 4.5 psi weight is countered by a high-volume surge of air coming through the orifices 40 to provide a 5-6 psi counterforce to the 4.5 psi downward force generated by the weight of the organic matter 36. In this regard, the accumulation of pressurized air in the accumulator 47 of the compressor system 44 provides for the high-volume rush of air.

By moving the mass of organic matter 36 in the presence of a high-volume surge or blast of pressurized air according to the present invention, the resulting less dense mass of organic matter 36 results in a reduction of the pressure of aeration air required to provide effective aeration to 2-3 psi in the air header 43, whereas, with a dense cake which would otherwise result, the back pressure of aeration air may build up to 5-6 psi in the air header 43 due to the inability of the aeration air to penetrate the mass and circulate through the organic matter as a result of the dense, compressed charge of organic matter 36. When such a back pressure builds up in the aeration air, the air will be too hot at relatively warm ambient temperatures for safe aerobic decomposition, thus requiring cooling equipment which represents a large capital expense and a large operating expense. The present invention avoids this.

As already alluded to, the surge of air according to the present invention will be initiated only at a certain level of hydraulic pressure in the hydraulic system which drives the ram 30. Such hydraulic pressure at which the surge is initiated corresponds with a desirable density for the mass of organic matter 36. The surge of pressurized air at that hydraulic pressure ensures that the density of the mass of organic matter 36 does not exceed the desired level.

Although the invention has been described with reference to a specific exemplary embodiment, it is to be understood that many modifications, variations and equivalents are possible within the scope of the appended claims.

What is claimed is:

1. A composting apparatus for the accelerated aerobic decomposition of organic matter, the apparatus comprising:
   a vessel having a chamber;
   an inlet to said chamber of said vessel and an outlet from said chamber of said vessel;
   a ram coupled with said vessel, said ram being movable with respect to said vessel, whereby organic matter deposited in said vessel through said inlet may be moved through said chamber toward said outlet by the movement of said ram;
   a set of orifices in said vessel for introducing pressurized air into said vessel;
   a surge providing means, in communication with said set of orifices, for delivering into said vessel, at least at certain times when said ram is acting upon the organic matter, a surge of pressurized air of such intensity as to effect movement of the organic matter through said chamber with substantially less force from the ram, and thus substantially less compaction of organic matter, than if no such surge were provided; and aerating means, also in communication with said set of orifices, for aerating the organic matter when it is in said chamber, said aerating means introducing air into said chamber via said set of orifices at a lesser intensity than that provided by said surge delivering means.

2. A composting apparatus as defined in claim 1:

wherein said aerating means includes a source of pressurized air in conjunction with means coupled with said source of pressurized air for operating said source of pressurized air to provide air to said chamber at a lesser intensity than when said surge providing means is operative; and wherein said surge providing means includes said source of pressurized air in conjunction with means for regulating said source of pressurized air to provide air to said chamber at a greater intensity than when said aeration means is in operation.

3. A method for composting organic matter comprising the steps of:

depositing organic matter into a chamber of a vessel;

exerting a compressive force on said organic matter in said chamber to advance the organic matter through the chamber;

during at least part of said exerting step, delivering into said chamber through a set of orifices a surge of pressurized air of such intensity as to effect movement of said organic matter through said chamber by an application of compressive force which is substantially less than the compressive force required to move the organic matter absent the surge of air, thereby providing a substantially less dense mass of organic matter moving through the chamber of the vessel than would be produced absent said surge delivering step; and aerating the organic matter by introducing air into the chamber through said orifices at a lesser intensity than that provided by said surge delivering step.

* * * * *